United States Patent [19]
Jernigan et al.

[11] Patent Number: 5,815,976
[45] Date of Patent: Oct. 6, 1998

[54] FISHING ROD HOLDER SECURABLE TO THE BUMPER OF A VEHICLE

[76] Inventors: Terry A. Jernigan, 5853 Farmwood Loop, Wilson, N.C. 27895; James R. Massey, 5911 Massey Rd., Zebulon, N.C. 27597

[21] Appl. No.: 659,706

[22] Filed: Jun. 10, 1996

[51] Int. Cl.⁶ .................................................. A01K 97/10
[52] U.S. Cl. ........................... 43/21.2; 224/922; 248/538
[58] Field of Search .............................. 43/21.2; 248/514, 248/534, 538; 224/922

[56] References Cited

U.S. PATENT DOCUMENTS

| | | | |
|---|---|---|---|
| 4,372,072 | 2/1983 | Comeau | 43/21.2 |
| 5,033,223 | 7/1991 | Minter | 43/21.2 |
| 5,205,446 | 4/1993 | Greenberg | 224/922 |
| 5,247,759 | 9/1993 | Noriega | 43/21.2 |
| 5,435,473 | 7/1995 | Larkum | 224/922 |
| 5,460,306 | 10/1995 | Rudd | 224/922 |

*Primary Examiner*—Kurt Rowan
*Attorney, Agent, or Firm*—Rhodes, Coats & Bennett, LLP

[57] ABSTRACT

A fishing rod holder including a connector plate that connects directly to the bumper of a vehicle. Secured to the connector plate is a coupler for receiving and connecting to an elongated arm. The elongated arm in turn includes a series of sleeve holders and the sleeve holders are designed to accept and support a series of fishing rod sleeves. The elongated arm includes a connector arm that extends into the coupler and the coupler effectively attaches the connector plate to the connector arm.

5 Claims, 2 Drawing Sheets

FISHING ROD HOLDER SECURABLE TO THE BUMPER OF A VEHICLE

FIELD OF INVENTION

The present invention relates to fishing rod holders, and more particularly to a fishing rod holder of the type that is capable of being detachably mounted to the bumper of a vehicle.

BACKGROUND OF THE INVENTION

It is known to provide a support structure for supporting fishing rods wherein the support is attachable to the bumper of a vehicle. Typically, these support structures are formed of an elongated member, such as a piece of wood, and the elongated member is provided with a type of strap structure that is attachable to the bumper. In many cases, these fishing rod holders are unstable and difficult to attach and detach. In addition, the designs often are not clean and neat and in the end, are not aesthetically pleasing.

There is a need for a fishing rod holder structure that can be easily secured to the bumper of a vehicle and once secured, is stable and effective to transport fishing rods.

SUMMARY AND OBJECTS OF THE INVENTION

The present invention entails a fishing rod holder assembly that is adapted to be mounted to the license plate area of the bumper of a vehicle. The fishing rod holder of the present invention entails a bumper connector plate that connects to the bumper adjacent the license plate area. A coupler extends from the bumper connector plate and is adapted to receive and connect to a stud shaft or connector that extends from the rear side of an elongated arm that carries a series of sleeve holders thereon. The sleeve holders are designed to receive a series of fishing rod support sleeves.

In this design, the arm carrying the sleeve holders can be easily detached from the coupler associated with the bumper plate and stored in a convenient location until a need arises again to transport fishing rods.

It is therefore an object of the present invention to provide a simple structure for transporting fishing rods wherein the structure is designed to be detachably secured to the bumper of a vehicle.

Another object of the present invention is to provide a fishing rod support structure that is attachable to a vehicle wherein the structure is specifically designed to be attached to the license plate area of the bumper.

Another object of the present invention resides in the provision of a fishing rod support structure that is designed to be detachably secured to the bumper of a vehicle wherein a portion of the support structure may remain attached to the bumper while a second portion of the support structure may be removed therefrom and stored.

Other objects and advantages of the present invention will become apparent and obvious from a study of the following description and the accompanying drawings, which are merely illustrative of such invention.

DETAILED DESCRIPTION OF THE INVENTION

Figure 1:
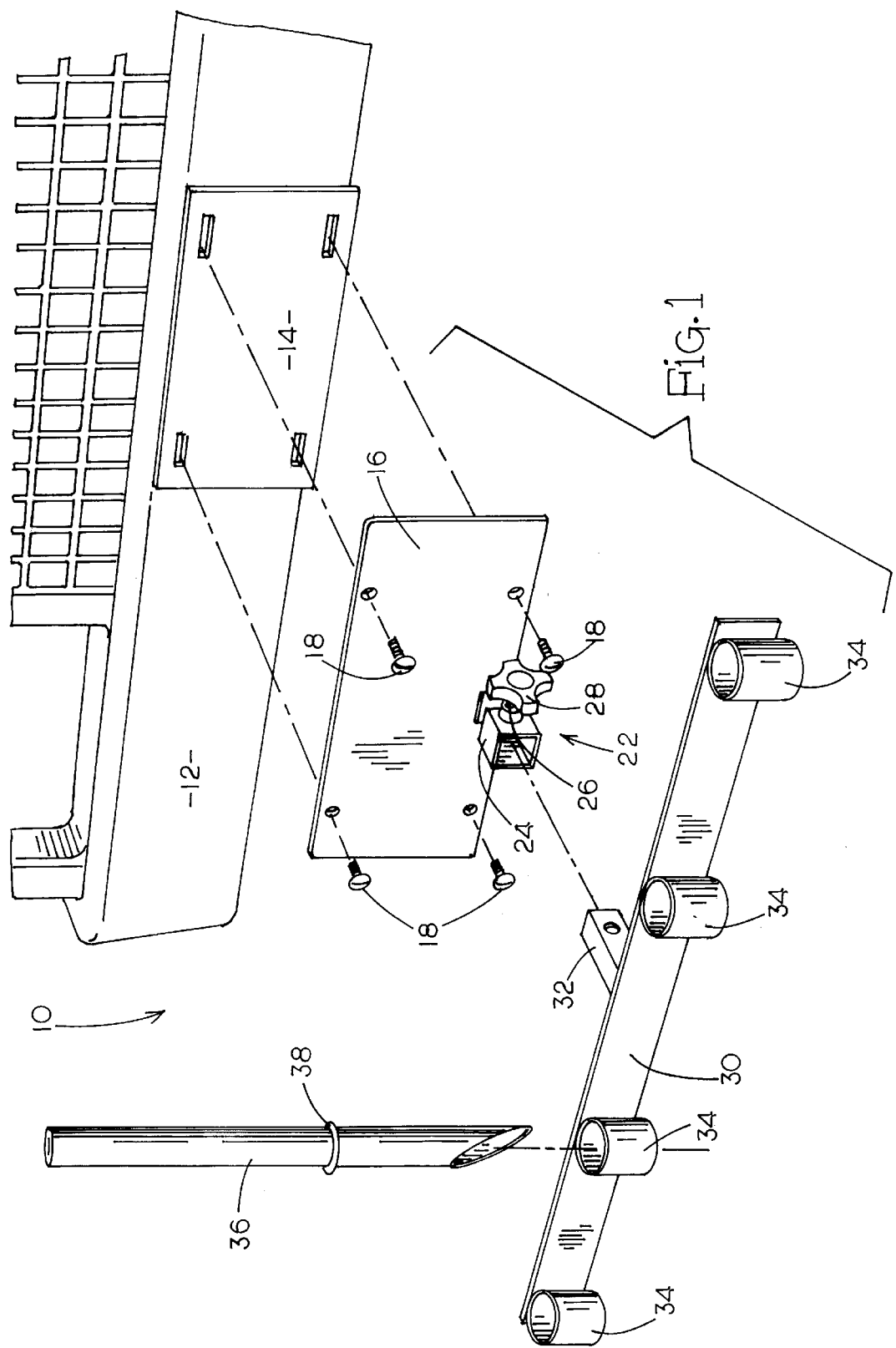
FIG. 1 is an exploded view showing the basic components of the fishing rod holder of the present invention and illustrating how the same attaches to the bumper of a vehicle.

With further reference to the drawings, the fishing rod support structure is shown therein and indicated generally by the numeral 10. As will be appreciated, fishing rod support structure 10 is designed to be detachably mounted to a vehicle and in particular, is designed to be mounted to the bumper 12 of a vehicle.

Conventional bumpers include a license plate area 14 that includes a plurality of bolt apertures formed therein. Typically, the license plate area 14 is designed to receive and support a license plate or other form of indicia.

The fishing rod support structure 10 of the present invention is designed to be mounted directly to the license plate area 14 of the bumper 12. In this regard, the support structure is provided with a bumper plate or connector plate 16. Bumper plate 16 is attached directly to the license plate area 14 of the bumper 12 by a series of bolts 18 and nuts (not shown).

Figure 2:
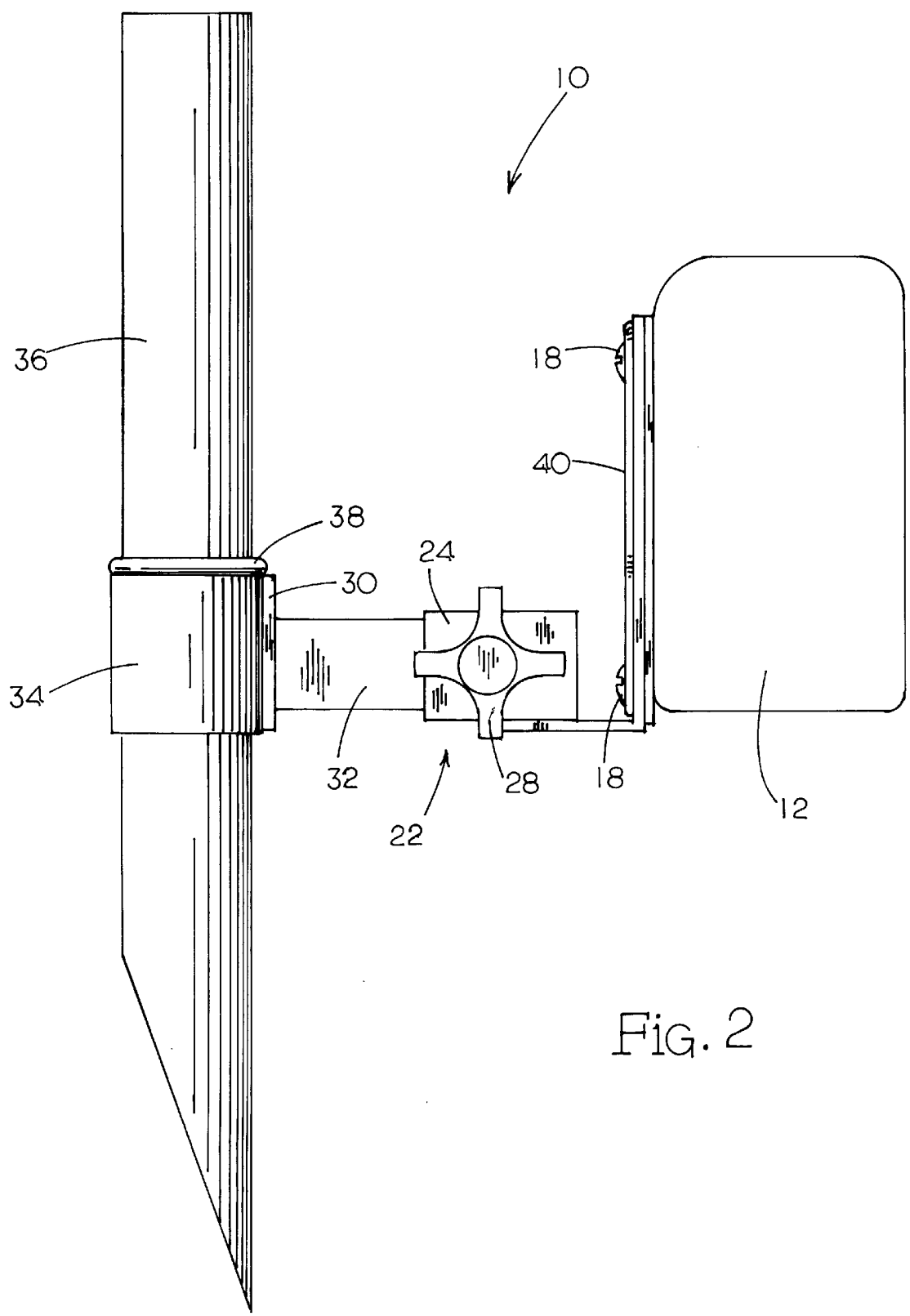
FIG. 2 is a side elevational view of the fishing rod holder of the present invention, shown attached to the bumper of a vehicle.

Projecting outwardly from the bumper plate 16 is a coupler indicated generally by the numeral 22. Coupler 22 includes a channel 24 that is spaced outwardly from the bumper plate 16 and is supported by an L-shaped bracket (FIG. 2). One side of the channel 24 includes an opening therein and the opening is threaded to receive a fastener or bolt 26. Secured to the outer end of the bolt 26 is a knob 28. Consequently, the bolt serves as a set type bolt in that the same can be turned inwardly and outwardly with respect to the interior of the channel 24.

A support structure is designed to be coupled to the coupler 22. This support structure includes an elongated arm 30 having a series of laterally spaced sleeve holders 34 secured thereon. A connector arm or connector 32 extends from one side of the arm 30 and is designed to be inserted into the channel 24. Consequently, it is appreciated that once connector 32 is inserted within channel 24 that the bolt 26 can be screwed against the connector 32 thereby securely securing the arm 30 and the connector 32 within the channel 24. This effectively secures the arm 30 to the bumper plate 16.

Each sleeve holder 34 is designed to receive a conventional fishing rod sleeve 36 that is typically constructed of PVC material or other suitable material. The fishing rod sleeves 36 are designed to be inserted downwardly into and through the sleeve holders 34. To keep the sleeve holders 34 from falling completely through the respective sleeve holders 34, each fishing rod 36 is provided with an outer rubber type O-ring 38. O-ring 38 is appropriately positioned on the sleeve 36 and once the sleeve 36 has been inserted into a respective sleeve holder, the O-ring 38 engages the top rim of the sleeve holder 34 and prevents the sleeve 36 from continuing to drop through the sleeve holder.

The outer or front face of the bumper plate 16 defines a surface for receiving a license plate or other indicia if such is required or desired. Note in FIG. 2, there is a license plate 40 secured to the outer face of the bumper plate 16 by bolts 18. As is appreciated, the support structure 10 of the present invention is designed to be mounted to the license plate area 14 of the bumper 12. However, this same support structure provides a space and location for mounting a license plate or other indicia.

In an attached mode, the arm 30 is secured within coupler 22 and the bumper plate 16 is fastened securely to the license plate area 14 of the bumper 12. This enables a group of fishing rod sleeves 36 to be supported by the arm 30. A series of fishing rods can then be inserted handle end first downwardly into the sleeve 36. This provides support for the various fishing rods. In the attached mode, the fishing rods will extend upwardly from the sleeves 36.

It is appreciated that the arm 30 can be removed from the coupler 22 while the coupler 22 and bumper plate 16 remain attached to the license plate area 14 of the bumper 12. Consequently, when one desires to utilize the present invention, the arm 30 can simply be attached to the coupler 22 and the fishing rod sleeves 36 inserted and supported within the sleeve holders 34.

From the foregoing description, it is appreciated that the present invention presents a simple and reliable support structure for supporting fishing rods and which attaches to the bumper of a vehicle. Once attached, the entire support structure is stable and presents a compact pleasing appearance and at the same time provides a way of supporting a series of fishing rods adjacent the bumper of a vehicle.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A fishing rod support structure adapted to be connected to a license plate receiving area of a vehicle bumper wherein the license plate receiving area includes a series of bolt openings formed therein, the fishing rod support structure comprising:
   a) a generally flat connector plate having a series of bolt openings formed therein that permits the connector plate to be secured directly to the license plate receiving area of the bumper through the bolt openings formed in the license plate area;
   b) the connector plate including first and second sides with the first side being adapted to be flush-mounted and fitted against the license plate receiving area of the vehicle bumper while the second side of the connector plate faces outwardly from the vehicle bumper;
   c) a series of bolts associated with the connector plate for extending through the bolt openings within the connector plate and through the bolt openings within the license plate receiving area for bolting the bumper plate directly to the license plate receiving area of the bumper;
   d) a coupler secured to the connector plate and projecting outwardly from the second side thereof;
   e) the coupler including a channel for receiving and holding a part of the fishing rod support structure and a fastener associated with the coupler and the channel thereof for securing a part of the fishing rod support structure within the opening;
   f) a fishing rod holding structure separate of the connector plate and channel but adapted to be inserted into the coupler and supported thereby; and
   g) said fishing rod holding structure including:
      1) a connector arm that is adapted to be inserted into the channel and to be fastened and secured therein by the fastener associated with the coupler;
      2) an elongated cross arm secured to the connector arm and extending generally perpendicular thereto;
      3) a series of laterally spaced sleeve holders secured to the elongated cross arm; and
      4) a series of fishing rod sleeves secured within the sleeve holders disposed on the elongated cross arm.

2. The fishing rod support structure of claim 1 wherein the opening that forms a part of the coupler includes an elongated hollow tube and wherein the fastener includes a threaded bolt that is threaded into a threaded opening formed in the elongated tube and wherein the bolt includes a turn handle that enables the threaded bolt to be screwed into a fastening relationship with the connector arm when the connector arm is inserted into the tube.

3. The fishing rod support structure of claim 2 including an L-shaped arm interconnecting the second side of the connector plate with the coupler.

4. The fishing rod support structure of claim 3 wherein the second side of the connector plate forms an outer face for receiving and holding a license plate.

5. The fishing rod support structure of claim 1 wherein there is provided an O-ring disposed exteriorly around respective fishing rod sleeves for engagement with the sleeve holder so as to support the respective fishing rod sleeve in a fixed position within the respective sleeve holders.

* * * * *